United States Patent [19]

Pinnavaia et al.

[11] Patent Number: 5,302,709
[45] Date of Patent: Apr. 12, 1994

[54] POLYARYL-METALLIC COMPLEX INTERCALATED LAYERED DOUBLE HYDROXIDES

[75] Inventors: Thomas J. Pinnavaia, East Lansing, Mich.; Elena M. Perez-Bernal; Ricardo Ruarno-Casero, both of Salamanca, Spain; Malama Chibwe, East Lansing, Mich.

[73] Assignee: Board of Trustees operating Michigan State University, East Lansing, Mich.

[21] Appl. No.: 981,603

[22] Filed: Nov. 25, 1992

[51] Int. Cl.$^5$ ............... C09B 47/20; C09B 47/24
[52] U.S. Cl. ................. 540/131; 540/129
[58] Field of Search ......... 540/129, 131; 534/14; 552/293

[56] References Cited

U.S. PATENT DOCUMENTS

| | | | |
|---|---|---|---|
| 3,371,031 | 2/1968 | Strang | 568/26 |
| 5,079,203 | 1/1992 | Pinnavaia et al. | 504/84 |
| 5,114,691 | 5/1992 | Pinnavaia et al. | 423/244 |
| 5,114,898 | 5/1992 | Pinnavaia et al. | 502/406 |

FOREIGN PATENT DOCUMENTS 0453021 10/1991 European Pat. Off. .

OTHER PUBLICATIONS

Leznoff, Phthalocyanines, vol. 2 New York, VCH, 1993, p. 10.
Perez-Bernal, Chemical Abstracts vol. 116, 1992 Abstract 58691f.
W. T. Reichle in Solid State Ionics, 22, 135, (1986).
M. A. Drezdzon in Inorg. Chem., 27, 4628 (1988).
K. Chibwe and W. Jones in Chem. Comm., 926 (1989).
Park et al., Chem. Lett 2057 (1989).
W. T. Reichle In J. Catal. 94, 547 (1985).
J. H. Schutten, P. Piert and A. L. German in Die Makromol. Chem., 180, 2341 (1979).
Weber amd Busch in Inorg. Chem., 4 469 (1965).

*Primary Examiner*—Mukund J. Shah
*Assistant Examiner*—P. K. Sripada
*Attorney, Agent, or Firm*—Ian C. McLeod

[57] ABSTRACT

A layered double hydroxide intercalated with a metal complex of a polyaryl compound is described. A preferred complex is porphin or phthylocyanine. The metals are preferably selected from Group VII-B and Group VIII cobalt and iron triads. The resulting LDH metal complexes are useful for the oxidation of oxidate compounds such as thiols and phenols.

13 Claims, 7 Drawing Sheets

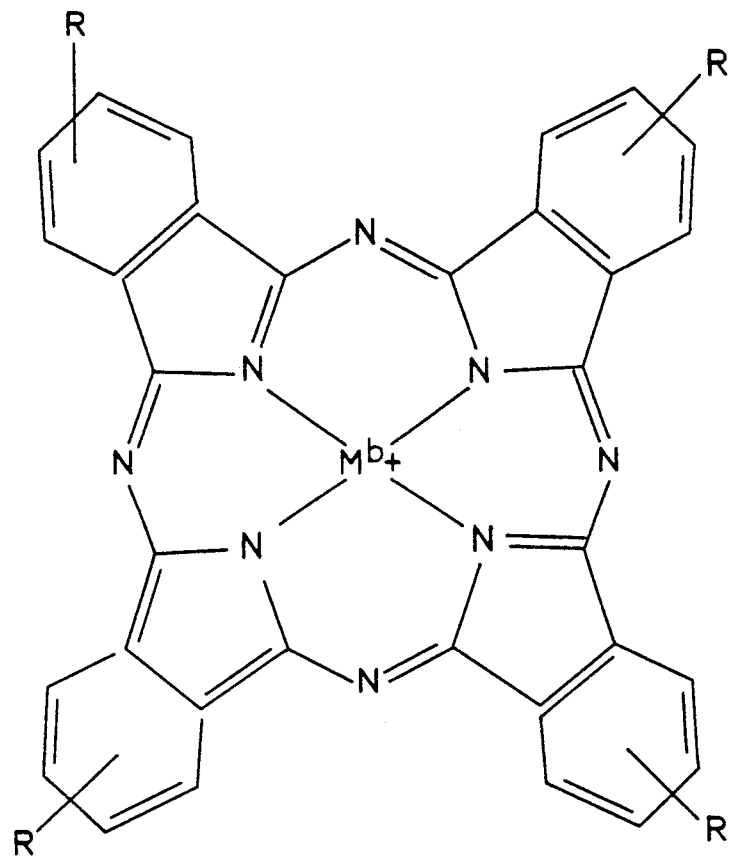
FIG. IA

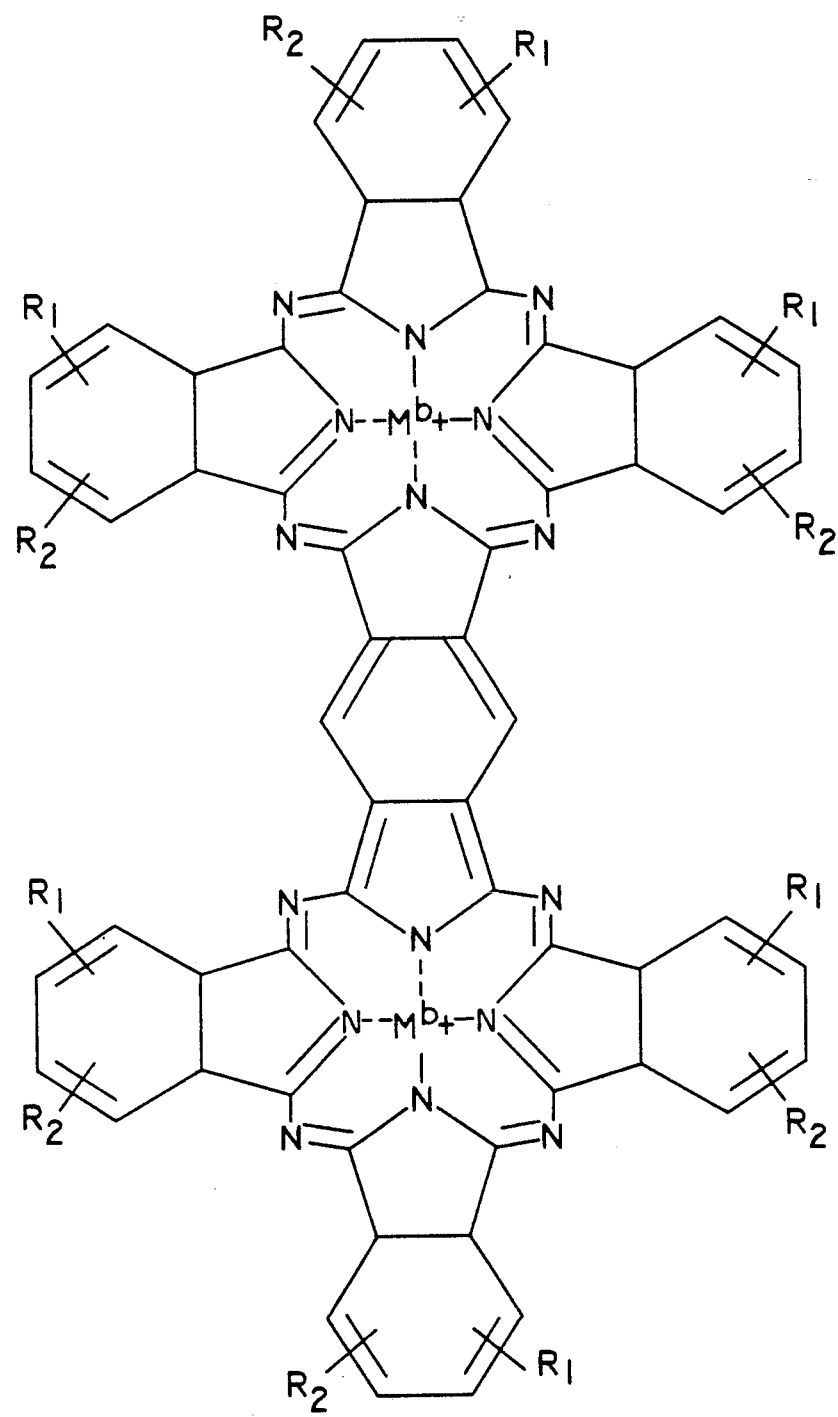
FIG. IB

FIG. IC
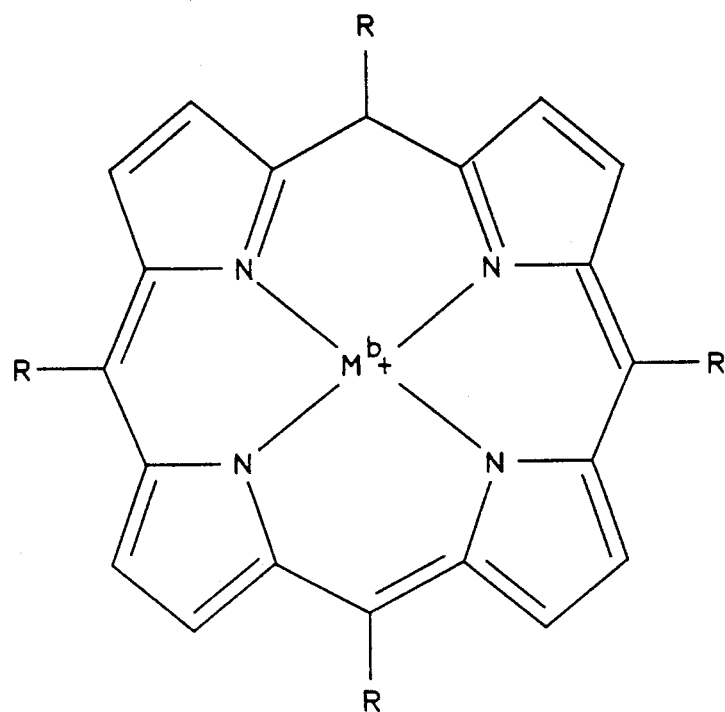
FIG. ID
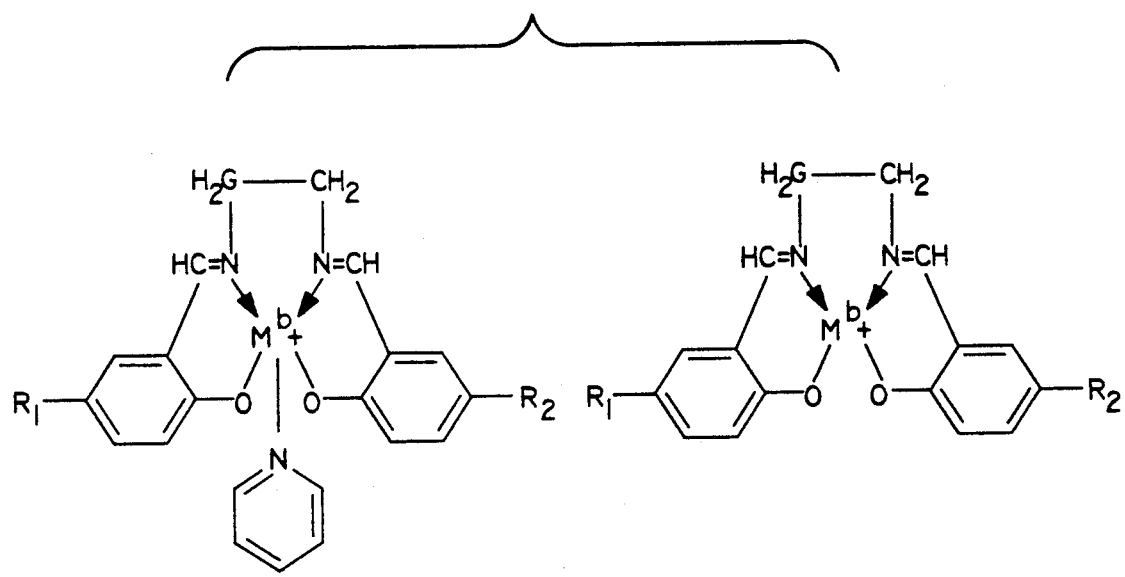

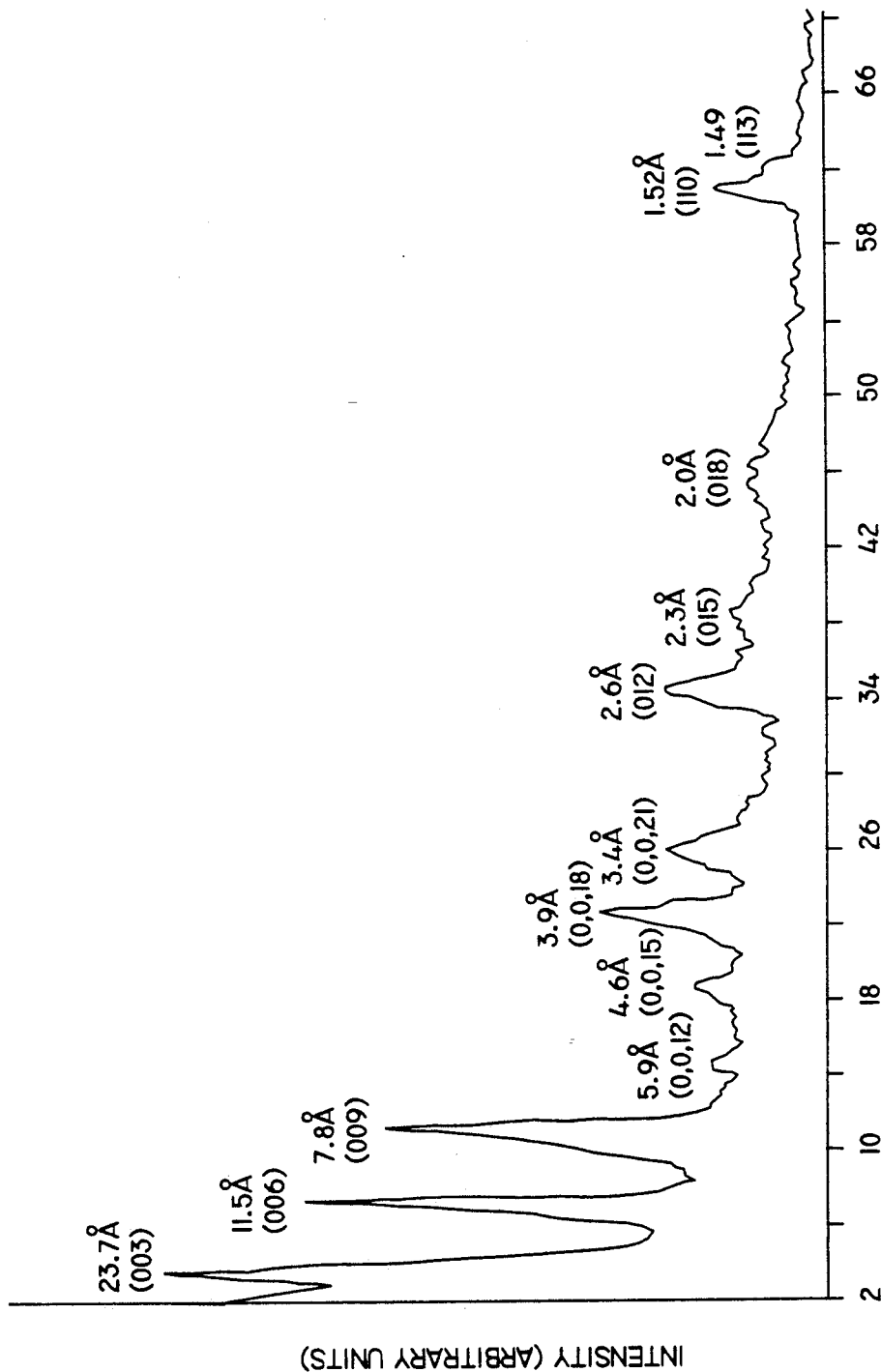

POLYARYL-METALLIC COMPLEX INTERCALATED LAYERED DOUBLE HYDROXIDES

BACKGROUND OF THE INVENTION (1) Field of the Invention

The present invention relates to polyaryl metal complexes, such as metallo macrocycles or Schiff's bases, intercalated into layered double hydroxides (LDHs) which are useful as stable catalysts, particularly for autoxidation of organic molecules. In particular, the present invention relates to cobalt phthalocyanine layered double hydroxides and cobalt porphyrin layered double hydroxides.

(2) Prior Art

Metallo phthalocyanines and porphyrins are known to catalyze the selective autoxidation of certain organic molecules in homogenous solutions at relatively low temperatures. Iron derivatives, for instance, mimic much of the catalytic chemistry found for metabolic pathways involving P-450 heme proteins. This property is of interest for applications in remediation of contaminated ground water and industrial effluents. There is commercial interest in the application of the Co(II) phthalocyaninetetrasulfonate as thiol oxidation catalysts in petroleum fractions, for instance, but the practical utilization of the homogenous catalysts is, however, severely hindered by several problems. Firstly, the homogenous catalysts tend to deactivate quickly and this is thought to arise from the very nature of the materials in that the complexes tend to dimerize in solution. For example, the iron(II) porphyrins and phthalocyanines under oxidizing reaction conditions form dimeric forms containing LFe-O-FeL linkages (where L is a macrocyclic ligand) and in this form they are unable to bind and activate oxygen. Secondly, homogenous catalysts cannot be easily separated from the solution and the recovery costs are prohibitive.

The possibility of increasing the catalyst life and possible enhancement of the rate of the reaction lies in the ability to site isolate the catalyst on a support. Several supports have been reported to date, such as charcoal, polymers and zeolites. Site isolation in the zeolites has been achieved by the so-called "ship-in-a-bottle" synthetic methods. Typically this is done by in situ reaction of a smaller building block with a metallo form of the zeolite.

European Patent No. 0 453,021 A1 describes a process for preparing a ketone and/or alcohol by oxidizing a cyclic hydrocarbon with oxygen to form a hydroperoxide, followed by a decomposition of the hydroperoxide in the presence of a phthalocyanine or porphyrin metal complex immobilized on a carrier. The carrier as disclosed in this patent may be inorganic materials such as alumina, $TiO_2$, $SiO_2$ or organic carriers such as polystyrene, ethylenevinylacetate copolymer, acid anhydride-modified polyethylene. When a material such as silica is used as a carrier, halogenated porphyrins or phthalocyanines are heated over time in pyridine together with silica and then the excess porphyrines or phthalocyanines are washed off the silica.

The present invention discloses the use of certain planar or disc-shaped anionic metal complexes including macrocycles such as phthalocyanines, porphyrines and Schiff's bases. The metallo phthalocyanine contains at least four pyrrole rings and at least eight nitrogen atoms with four of them closer to the center containing a metal cation. Fused to the four pyrrole rings are four benzene rings and these rings can contain anionic substituents such as sulfonate, carboxylate and the like The overall description is represented by the following formula:

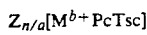

$$Z_{n/a}[M^{b+}PcTsc] \qquad (I)$$

where Pc represents the phthalocyanine or porphyrin or Schiff's base ring, Tsc represents four substituted anionic charge bearing substituents such as sulfonate or carboxylate distributed on all four rings or, alternatively, two substituents on two rings, Z represents the charge balancing cation such as sodium, n represents the overall anion charge on the phthalocyanine or porphyrin or Schiff's base, a is the charge of Z and $M^{b+}$ is characterized in which the metal contained in the metallo macrocycle complex is a member selected from the group consisting of (a) a Group VII-B metal (e.g., Mn, Tc and Re), (b) metals from the cobalt and iron triads of Group VIII (e.g., Co, Fe, Rh, Ir, Ru and Os or (c) a mixture of at least two different metal macrocycles from (a) and (b). Examples of metallo phthalocyanines include Co(II)phthalocyaninetetrasulfonate, Co(II)phthalocyaninetetracarboxylate, Ni(II)phthalocyaninetetrasulfonate, Ni(II)phthalocyaninetetracarboxylate, Cu(II)phthalocyaninetetrasulfonate, Cu(II)phthalocyaninetetracarboxylate, Co(II)dinuclear dodecasulfonatephthalocyanine, Co(II)dinuclear dodecarboxyphthalocyanine, Cu(II)dinuclear dodecasulfonatephthalocyanine, Cu(II)dinucleardodecarboxyphthalocyanine, Ni(II)dinucleardodecasulfonatephthalocyanine, Ni(II)dinuclear dodecarboxyphthalocyanine. Examples of metallo porphyrines include Co(II)5,10,15,20-tetra(4-sulfonatophenyl)porphin, Co(II)5,10,15,20-tetra(4-carboxylatephenyl)porphin, Ni(II)5,10,15,20-tetra(4-sulfonatophenyl)porphin, Ni(II)5,10,15,20-tetra(4-carboxylatephenyl)porphin. Examples of metallo Schiff's base complexes include Co(II)bis-(salicylaldehyde) ethylenediaminebi-sulfonate, Co(II)bis(salicylaldehyde)-ethylenediaminebi-carboxylate, Cu(II)bis(-salicylaldehyde)ethylenediaminebi-sulfonate, Cu(II)bis (salicylaldehyde)ethylenediaminebi-carboxylate, Ni-(II)bis(salicylaldehyde) ethylenediaminebi-sulfonate, Ni(II)bis(salicylaldehyde) ethylenediaminebicarboxylate, Cu(II)pyrrole-bis(salicylaldehyde) ethylenediaminebi-sulfonate, Cu(II)pyrrolebis(salicylaldehyde)ethylenediaminebi-carboxylate, Co(II)pyrrole-bis(salicylaldehyde) ethylenediaminebisulfonate, Co-(II)pyrrole-bis(salicylaldehyde) ethylenediaminebi-carboxylate, Ni(II)pyrrolebis(salicylaldehyde)ethylenediaminebi-sulfonate, Ni(II)pyrrole-bis(-salicylaldehyde) ethylenediamine bicarboxylate.

Under homogenous conditions these complexes are good oxidation catalysts for oxidizing a mercapto compound to a disulfide and as taught in U.S. Pat. No. 3,371,031 to Strong, a phthalocyanine or Schiff's base catalyst is usually preferred for the oxidation. These homogenous phthalocyanine and Schiff's base catalysts are also found to be effective catalysts for the oxidation of substituted phenols to their corresponding quinones. Vipin. M. Kothari and James J. Tazuma (J. Catal. 41, 180, 1976) have reported the autoxidation of 2,6-dialkyl substituted phenols using salcomines, the complexes derived from cobalt(II) and Schiff's bases of salicylaldehyde and ethylenediamine using N, N'-dimethylformamide as the solvent. Salcomines were found to catalyze the oxidation of monoalkylphenols and phenol but required higher temperature and more severe conditions compared to the Co(II)phthalocyanine. Deactivation of the homogenous catalyst is thought to arise from the dimerization of the complexes, particularly in the presence of hydroxide ions, and in this form, the complexes are unable to bind and activate molecular oxygen.

LDH's are a group of anionic clay minerals. These compounds have positively charged sheets of metal hydroxides, between which are located anions and some water molecules. Most common LDHs are based on double hydroxides of main group metals such as Mg and Al, and transition metals such as Ni, Co, Cr, Zn, and Fe. These anionic clays have a structure similar to brucite ($Mg(OH)_2$) in which the magnesium ions are octahedrally surrounded by hydroxyl groups with the resulting octahedra sharing edges to form infinite sheets. In the LDHs, some of the magnesium is isomorphously replaced by a trivalent ion such as $Al^{3+}$. The $Mg^{2+}Al^{3+}OH$ layers are then positively charged, necessitating charge balancing by insertion of anions between the layers. One such anionic clay is hydrotalcite in which the carbonate ion is the interstitial anion, and has the idealized unit cell formula $Mg_6Al_2(OH)_{16}[CO_3]\cdot 4H_2O$. However, the ratio of Mg/Al in hydrotalcite-like can vary between 1.7 and 5 and various other divalent and trivalent ions may be substituted for Mg and Al. In addition, the anion, which is carbonate in hydrotalcite, can be varied by synthetic means by a large number of simple anions such as $NO_3^-$, $Cl^-$, $OH^-$, $SO_4^{2-}$ etc. These LDH's, based on their structure, fall into the pyroaurite-sjogrenite group, where brucite-like layers carrying a net positive charge alternate with layers in which oxygen atoms of carbonate groups and water molecules are distributed on a single set of sites. Such LDH materials are described in U.S. Pat. Nos. 5,079,203, 5,114,691 and 5,114,898 to Pinnavaia et al.

A review article by W. T. Reichle in Solid State Ionics, 22, 135, (1986) summarizes some of the methods available for LDH synthesis. If a carbonate-containing product is desired, then the aqueous solution of magnesium and aluminum salts, i.e, nitrate, or chloride, is added to an aqueous solution of sodium carbonate with good mixing at room temperature. The resulting amorphous precipitate is then heated for several hours at 60° to 200° C. to obtain a crystalline material. Washing and drying completes the synthesis in quantitative yield. By employing this precipitation method, replacement of all or part of $Mg^{2+}$ with other $M^{2+}$ ions such as $Zn^{2+}$, $Cu^{2+}$ and the like, or replacement of $Al^{3+}$ with other $M^{3+}$ ions such as $Fe^{3+}$, $Cr^{3+}$ and the like is obtained.

Another important aspect of the synthesis of these materials is the ability to vary the nature of the interstitial anion. The preparation of hydrotalcite-like materials with anions other than carbonate in pure form requires special procedures, because LDH's incorporate carbonate in preference to other anions. Direct preparation of non-carbonate LDH's could be cumbersome requiring the exclusion of carbon dioxide at every step. Several alternative methods of intercalating non-carbonate organic and inorganic anions have been described in the prior art; for example, see Pinnavaia et al in U.S. Pat. No. 5,079,203, M. A. Drezdzon in Inorg. Chem., 27, 4628 (1988), K. Chibwe and W. Jones in Chem. Comm., 926 (1989). Hence, due to the availability of methods it is possible to obtain well defined non-carbonate intercalated LDH's. Park et al, Chem. Lett 2057 (1989) describes non-metalated tetrasulfonated porphyrin anion intercalated into the LDH structure. But it is well known by those skilled in the art that intercalating anionic metallo phthalocyanine or porphyrins could present unique problems. Although the rings bear anionic charge the positively charged metal cations could present difficulties since the host layers are positively charged and this could result in demetallation of the complex. It would be desirable to intercalate metallo macrocycles bearing an anionic charge on the rings into LDH hosts. Unlike polymers, which are organic, as supports for the metallo macrocycles for autoxidation reactions, anionic clay minerals are inorganic in nature and could function as long-lived practical regenerable supports.

OBJECTS

It is therefore an object of this invention to provide metallo macrocycles intercalated into LDH hosts that show improved oxidation activity and catalyst life. It is further an object to provide a novel process for producing the LDH intercalated complexes. It is further an object of the present invention to provide LDH intercalates that are relatively economical to produce and that are reusable. These and other objects will become, increasingly apparent by reference to the following description and the drawings.

IN THE DRAWINGS

FIGS. 1A to 1D show the structure of an anionic metallo phthalocyanine (FIG. 1A, where R is $COO^-$ or $SO_3^-$ and $M^{b+}$ is a metal cation; an anionic metallo dinuclear dodeca-anionicphthalocyanine (FIG. 1B) where R is $COO^-$ or $SO_3^-$ and $M^{b+}$ is a transition metal cation; an anionic metallo porphyrin (FIG. 1C) where $R_1=R_2$ or $R_1 \neq R_2$ and $R_1$ could be $COO^-$ or $SO_3^-$ and $R_2=COO^-$ or $SO_3^-$ and $M^{b+}$ is a metal cation, and anionic metallo Schiff's bases represented by salcomines and pyrrole salcomines (FIG. 1D) where $R^1$ and $R^2$ could be sulfonate or carboxylate and $M^{b+}$ is a metal cation.

FIGS. 2A and 2B show an X-ray powder diffraction patterns of the cobalt phthalocyanine tetrasulfonate intercalated $Mg_{2.5}$-Al-LDH before (FIG. 2A) and after use as a catalyst for phenol oxidation at 35° C., wherein 3200 catalyst turnovers were completed (FIG. 2B).

GENERAL DESCRIPTION

Figure 2B:
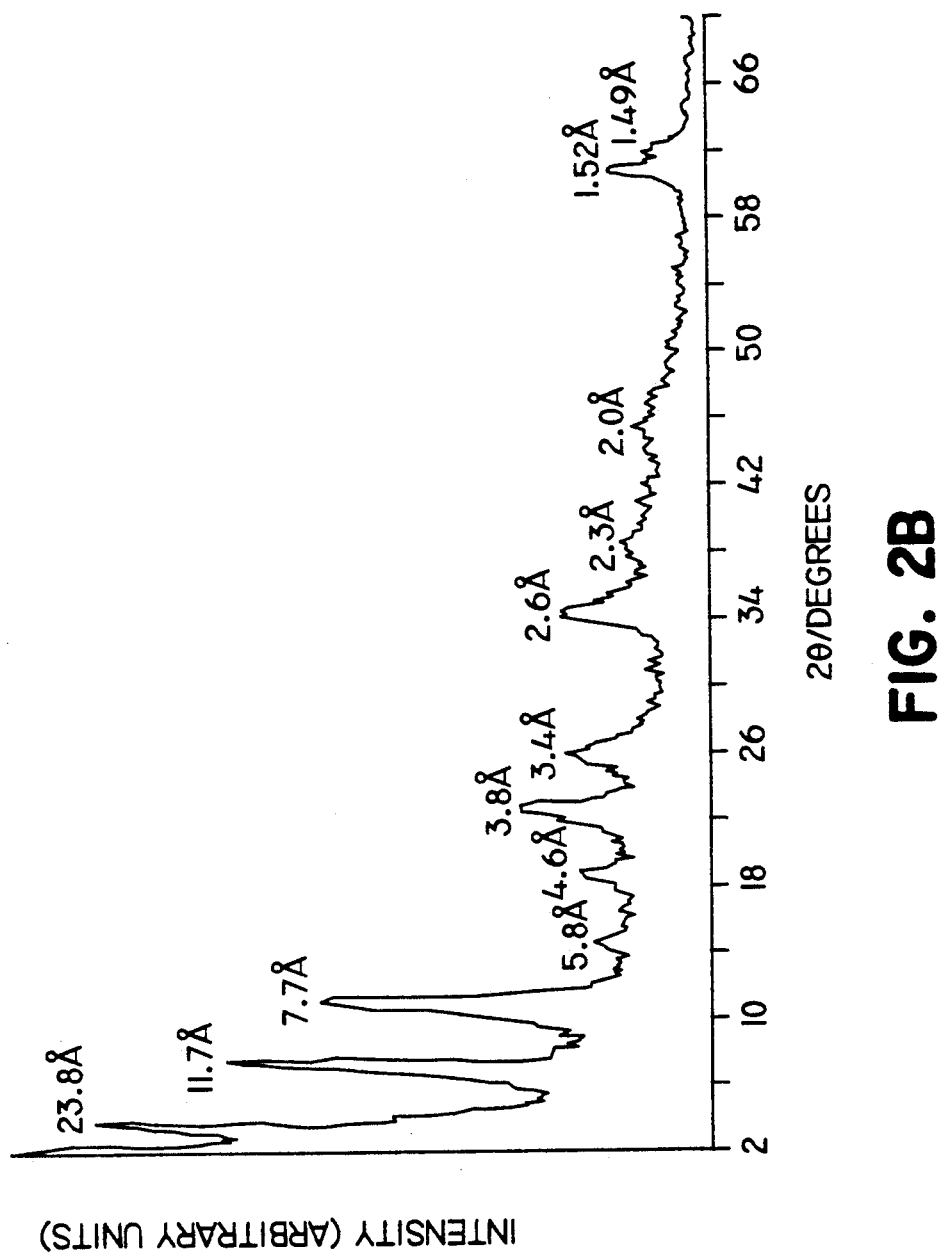
Figure 3:
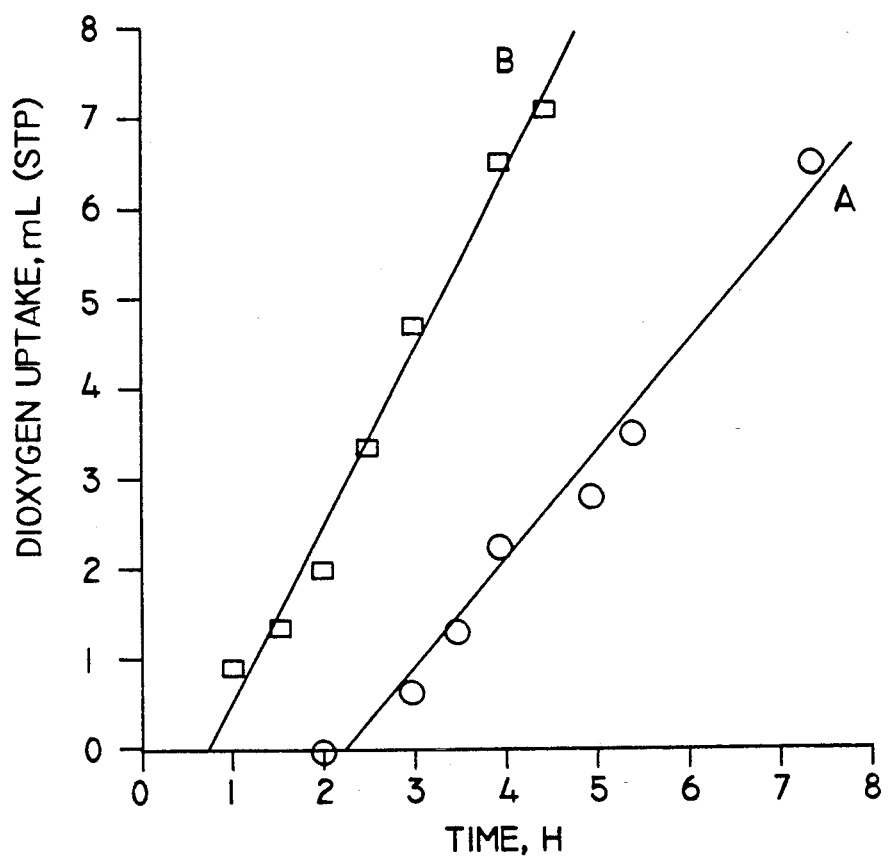
FIG. 3 shows the uptake plots for the autoxidation of $1.5 \times 10^{-2}$M 1-decanethiol at 35° C. in the presence of the $[CoPcTs]^{4-}$ as a catalyst where line A is for a homogenous catalyst, and where line B is for a LDH-intercalated catalyst. The reactions were carried out at a substrate/cobalt ratio of 154 and pH 9.25.

The present invention relates to a crystalline layered double hydroxide (LDH) metal complex which comprises:

$$[M^{II}_{1-x}M^{III}_x(OH)_2](A^{n-})_{x/n}\cdot yH_2O$$

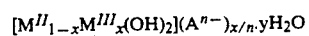

as a spaced apart hydroxide host layers wherein $M^{II}$ is a divalent metal cation, $M^{III}$ is a trivalent metal cation, and $A^{n-}$ is an intercalated anionic polyaryl metal complex with a disc-like shape, wherein the disc-like shape defines a plane across the disc-like shape with the plane of the complex such that the disc-like shape is approximately orthogonal to a plane of the LDH host layers, which have a basal spacing greater than approximately 18 Å and x is between about 0.17 and 0.37, and y is a positive number.

The preferred invention also relates to a process for the synthesis of a crystalline layered double hydroxide (LDH) which comprises: (a) heating an LDH precursor interlayered with anions capable of forming a gas upon heating to form a mixed metal oxide solid solution of anhydrous empirical formula:

$$M^{II}_{1-x}M^{III}_xO_{1-0.5x};$$ and wherein $M^{II}$ is a divalent metal cation, $M^{III}$ is a trivalent metal cation and x is between about 0.17 and 0.37; and (b) hydrolyzing the oxide solid solution in a decarbonated deionized water solution containing a molar excess of a sodium salt of an anionic polyaryl metal complex under flowing non-reactive gas to form the LDH polyaryl metal complex intercalation product wherein the metal polyaryl complex has a disc-like shape with the plane of the complex such that the disc-like shape is approximately orthogonal to a plane of the spaced apart hydroxide host layers which have a basal spacing greater than approximately 18 Å. Preferably step (a) is conducted at a temperature between about 300° C. and 550° C. Step (b) is conducted at between about 20° and 200° C., more preferably 75° C. Usually, at least about a ten percent (10%) molar excess of the polyaryl metal complex is used.

Further still, it is an object of the present invention to provide a method for catalytically oxidizing an oxidizable compound which comprises: (a) providing a crystalline layered double hydroxide (LDH) metal complex which comprises:

$$[M^{II}_{1-x}M^{III}_x(OH)_2](A^{n-})_{x/n}\cdot yH_2O$$

as a spaced apart hydroxide host layers wherein $M^{II}$ is a divalent metal cation, $M^{III}$ is a trivalent metal cation, y is a positive number, $A^{n-}$ is an intercalated anionic polyaryl metal complex with a disc-like shape wherein the disc defines a plane across the disc-like shape with the plane of the complex such that the disc-like shape is approximately orthogonal to a plane of the spaced apart hydroxide host layers which have a basal spacing greater than approximately 18 Å and x is between about 0.17 and 0.37, intermixed with the oxidizable compound in a solution in the presence of oxygen; and (b) adjusting the temperature of the solution so that the LDH metal polyaryl complex oxidizes the oxidizable compound at a suitable rate. Preferably the temperature for the oxidation reaction is between about 0° C. and 100° C.

The present invention particularly relates to the immobilization of metallo phthalocyanines, which carry functionalized rings such as to give a negative charge to make possible the intercalation into the layered double hydroxide, particularly a metallo phthalocyanine tetrasulfonate or porphin or Schiff's base (FIGS. 1A to 1D). The intercalation of the polyaryl metal complexes can be achieved by direct synthesis i.e. by adding the stoichiometric amounts of the complex anion during the synthesis of the layered double hydroxide. And in this case care has to be taken to exclude carbon dioxide.

Preferably the polyaryl metal complexes are intercalated by use of the calcined mixed metal oxide obtained from the LDH as a precursor.

The present invention uses the layered double hydroxides (LDHs) as host layers to immobilize by intercalation the anionic metallo macrocycles and Schiff's base autoxidation catalysts. The term "autoxidation" as used herein implies the use of dioxygen as the oxidizing agent. Oxygen in the atmosphere is sufficient to effect the reactions; however, it is possible to use other oxidizing agents such as hydrogen peroxide, iodosobenzene and the like.

The preferred LDHs name $M^{II}$ as $Co^{2+}$, $Ni^{2+}$, $Zn^{2+}$, $Mg^{2+}$, $Cu^{2+}$, $Ca^{2+}$, or $Fe^{2+}$ and $M^{III}$ as $Cr^{3+}$, $Al^{3+}$, or $Fe^{3+}$. Most preferred are magnesium aluminum LDH's.

The preferred metals in the polyaryl metal complex are selected from the group consisting of Group VII-B and Group VIII, particularly the cobalt and iron triads. In Group VII-B, the preferred metals are Mn, Tc and Re. In Group VIII the preferred metals are Co, Fe, Ph, Ir, Rn and Os.

There are numerous metal complexes as have been previously discussed. They have in common that they are polyaryl compounds.

SPECIFIC DESCRIPTION

The $Mg_6Al_2(OH)_{14}CO_3.yH_2O$ (abbreviated as $Mg_{2.5}Al$-LDH) and $Mg_6Al_2(OH)_{16}CO_3.yH_2O$ (abbreviated as $Mg_3Al$-LDH) was prepared by a co-precipitation of stoichiometric amounts of $Mg^{2+}$ and $Al^{3+}$ as described by W. T. Reichle in J. Catal 94, 547 (985). The layered double hydroxide should be such that it contains an anion, such as $CO_3$, which was decomposable upon calcination to between 300 550° C. and preferably 450° C. for 4 to 24 hours, but preferably 18 hours, and that the mixed oxide obtained is regenerable. The oxide material obtained was then reconstituted into an $Mg_3Al$-LDH-CoPcTs intercalation product by reacting the oxide with the sodium salt of the complex obtained. The salt of the complex was kept at least 10% molar excess and up to 10 times molar excess of the required amount for exchange and using decarbonated deionized water with flowing argon gas and then the calcined $Mg_3Al$-LDH was added slowly to a heated solution. The reconstitution reaction was carried out between 25° and 100° C. preferably between 60° and 75° C. The reaction can then be continued for periods ranging from 18 hours to seven days.

The layered double hydroxides are reliable supports for certain metallo macrocyclic compounds. In one embodiment, a thiol oxidation reaction was carried out using 1-decanethiol to demonstrate the advantages of intercalating a metallo phthalocyanine into the LDH's. Generally, the reaction is represented as follows:

$$2RS^- + O_2 + H_2O \rightarrow RSSR + HO_2^- + OH^- \quad (1)$$

$$2RS^- + HO_2^- + H_2O \rightarrow RSSR + 2H_2O + 3OH^- \quad (2)$$

where R is an alkyl or alkenyl or aromatic group.

Compared with the homogenous catalyst the LDH intercalated catalyst showed a significantly shorter induction time (45 minutes) and a larger turnover frequency of 40 mol thiol/$[CoPcTs]^{4-}$/hr. Of significance was the observation that while the homogenous catalyst was completely deactivated after one catalytic cycle involving only ~150 turnovers, no loss in activity was observed for the intercalated catalyst after five consecutive reaction cycles for a total of more than 770 turnovers. The catalyst was easily recovered by filtration, since it was a solid, and could be used further. The layered double hydroxide metal complex intercalated compounds are thus exceptionally promising support materials for improving the longevity of polyaromatic metallo macrocycles.

In yet another embodiment the homogenous catalyst and the LDH intercalated $[CoPcTs]^{4-}$ were tested at 35° C. for the selective autoxidation of phenol to quinones as follows:

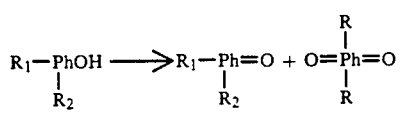

where $R_1$ and $R_2$ are hydrogen, alkyl and/or aromatic groups. Examples are di-t-butylphenol to 2,6-di-t-butyldiphenoquinone and 2,6,2',6'-tetra-t-butylbenzoquinone. A typical reaction was as follows:

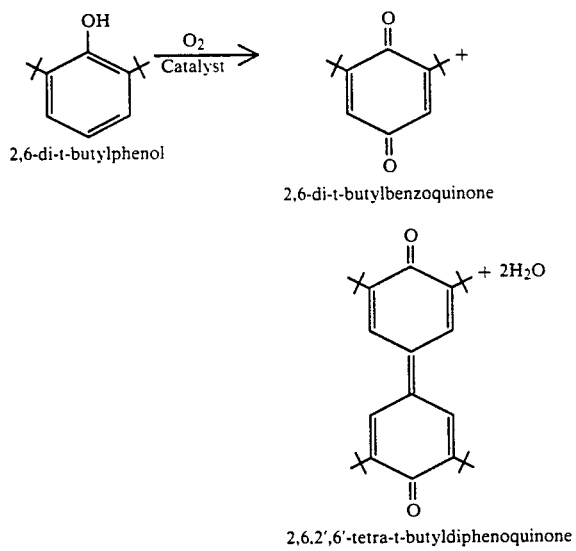

Linear oxygen uptake was observed in both cases. Significantly, the homogeneous reaction exhibited a lower rate of dioxygen uptake and the catalyst was deactivated almost completely. Deactivation was accompanied by the fading of catalyst blue color to bright green after about 25 turnovers (moles t-b-phenol/moles $CoPcTs^{4-}$). In marked contrast to the homogenous catalyst, the LDH metal complex exhibited about twice the rate of dioxygen uptake and remained fully active and it was possible to add more reactants without the catalyst deactivating. A total of 3200 turnovers (moles t-butyl-phenol/moles $CoPcTs^{4-}$) were obtained and the catalyst remained blue compared to the uncured catalyst (FIG. 2A) and in active form. X-ray powder diffraction of the used catalyst (FIG. 2B) indicated that the material maintained its integrity and was not destroyed in any way and hence was reusable. Deactivation of the homogenous catalyst is thought to arise from the dimerization of the complexes, particularly in the presence of OH, and in this form, are unable to bind and activate molecular oxygen (see J. H. Schutten, P. Piet and A. L. German in Die Makromol Chem., 180, 2341 (1979)). The phenols can also be oxidized to other oxidation products such as polyethers.

LDH-immobilized phthalocyanines and porphyrins possess the required stability for application in the remediation of polluted ground water and industrial effluents at ambient conditions. Greatly enhanced stabilities for some of these macrocycles is afforded by immobilization into the LDH host layers most probably because dimer formation is prevented.

Considering the fact that the metal centers are the active sites for the electron transfer and interaction with the reactants it is of paramount importance that these centers be accessible. Hence, on intercalation of the macrocycle or Schiff's base into the LDH host, it is preferable that the intercalate orient itself almost orthogonal to the layers so that the metal centers could still be accessible to oxygen and reactants. A basal spacing of approximately 18 Å or above is achieved. The charge on the LDH host can be modified by adjusting the value of x in the formula according to Equation (II). Therefore, it is possible to vary the amount of metallo complexes intercalated into the LDH host. The same catalyst stabilization, improved catalyst longevity and recyclability can be achieved for the metallo porphyrins and Schiff's bases.

The following examples will serve to illustrate certain embodiments of the herein disclosed invention.

EXAMPLE 1

The preparation of $Mg_3Al$-LDH is described in this example.

A solution of 25.6 g $Mg(NO_3)_2.6H_2O$ (0.10 mole) and 112.5 g $Al(NO_3.9H_2O$ (0.03 moles) in 70 mL deionized water was added dropwise to a solution of 14 g NaOH (0.35 mole) and 100 g anhydrous $Na_2CO_3$ (0.0943 mole) in 100 ml deionized water. The addition was carried out in a liter flask and uniform mixing was achieved by use of a magnetic stirrer. The addition was done at room temperature. A heavy slurry was observed to be formed The flask contents were then transferred to a heating mantle heated to and maintained at about 65° C. for 18 hours with continuous vigorous stirring. Thereafter, the resulting thick slurry was centrifuged and washed with a large excess of deionized water. The solid was then dried at 125° C. either in vacuum or air for 18 hours. The resulting white powder gives an X-ray powder diffraction profile of hydrotalcite. Using the above method it is possible to vary the Mg/Al ratio. And in addition other cations can be substituted for $M^{2+}$ and $Al^{3+}$ in the structure.

EXAMPLE 2

The preparation of $Mg_{2.5}Al$-LDH.

Example 1 was repeated except that the Mg/Al was 2.5.

EXAMPLE 3

The synthesis of tetrasodium salt of cobalt (II) 4,4',4'',4'''-tetrasulfonato phthalocyanine ($Na_4CoPcTs$) is described in this Example.

The preparation of sodium salt of cobalt (II) 4,4',4'',4'''-tetrasulfonato phthalocyanine followed closely that described by Weber and Busch in Inorg. Chem., 4 469 (1965). Cobalt (II) oxalate (2.54 g, 9.0 mmol) and sodium salt of 4-sulphophthalic acid (9.6 g, 36 mmol) were added to 0.4 g ammonium molybdate and 20 g urea. The mixture was ground to a homogenous paste and then divided into equal amounts. One half amount was then heated in a sealed 2 liter stainless steel bomb (autoclave) at 210° C. for 6 hours under an argon atmosphere. The resulting dark product was kept on a dish covered with aluminum foil. Another sample was treated under similar conditions in the autoclave. The resulting dark solid was added to the other dark sample and treated as follows the material was dissolved using 600 ml of 2% hydrochloric acid at 50° C. for about an hour, followed by addition of 200 ml of 5% sodium hydroxide. The sample was then filtered and about 200 ml at a time of the solution immediately poured into ~300 ml cold acetone causing the precipitation of the blue phthalocyanine product which was then centrifuged. Washing was accomplished with the use of warm ethanol. The product was then dried under vacuum.

EXAMPLE 4

The synthesis of tetrasodium salt of cobalt(II), 4,4′,4″,4‴-tetracarboxy phthalocyanine ($Na_4CoPcTc$) is described in this Example.

Cobalt oxalate (2.54 g, 9.0 mmol) and trimellitic acid (1.4 molar ratio) with 0.4 g ammonium molybdate and 20.0 g urea were ground to a homogenous paste and heated in a nitrogen atmosphere at 210° C. in a sealed bomb. The product was leached with hydrochloric acid (2%) followed by treatment with 300 ml of 50% hydroxide for 8 hours at 100° C. in a nitrogen atmosphere. The resulting solution of the product was filtered, and acidified with concentrated hydrochloric acid until the tetra-sodium salt of cobalt(II) tetracarboxy phthalocyanine precipitated. The product was collected by centrifugation, washed with warm ethanol and dried under vacuum.

EXAMPLE 5

The preparation of mixed metal oxide form from the layered double hydroxide prior to the exchange is described in this example.

The Mg-Al carbonate interlayed LDH with Mg/Al ratio of 3.0 obtained as described in Example 1 was heated at 450° C. for about 18 hours in air. The X-ray diffraction pattern obtained is indicative of a poorly crystalline material with an MgO type solid solution structure.

EXAMPLE 6

The preparation of another mixed metal oxide from layered double hydroxide is described in this example.

The sample from Example 2 was heated to 500° C. for 24 hours in argon. The X-ray diffraction pattern obtained was indicative of a poorly crystalline material with an MgO type structure.

EXAMPLE 7

The intercalation of Co(II) phthalocyanine tetrasulfonate $[CoPcTs]^{4-}$ is described in this example.

The oxide material obtained from Example 5 was reconstituted into an $Mg_3Al$-LDH-CoPcTs intercalation product by reacting the oxide with the sodium salt of the complex obtained in Example 3. The salt of the complex was kept at least 8-10 times the molar amount required for exchange and using decarbonated deionized water with flowing argon gas and then the calcined $Mg_3Al$-LDH was added slowly to a heated solution (the temperature was maintained at about 75° C.). The reaction was left running overnight. The product obtained was then washed with hot deionized water by centrifugation and then left to dry in a desiccator.

The product obtained displayed an X-ray powder diffraction pattern typical of a hydrotalcite-like material with a basal spacing of 23.7±0.2 Å. From the elemental analysis the LDH obtained has a formula: $Mg_5Al_{2.5}(OH)_{14.9}[CoPcTs]_{0.6}\cdot 4H_2O$.

EXAMPLE 8

The intercalation of Ni(II)phthalocyanine tetrasulfonate $[Ni(II)PcTs]^{4-}$ is described in this example.

Example 7 was repeated except for the use of the sodium salt of Ni(II)phthalocyaninetetrasulfonate obtained from Aldrich Chemical Co., Wisconsin, USA. The product obtained displayed an X-ray powder diffraction pattern typical of a hydrotalcite-like material with a basal spacing of 24.0±0.2 Å.

EXAMPLE 9

The intercalation of Co(II)tetracarboxy phthalocyanine $[Co(II)PcTs]^{4-}$ is described in this example.

Example 7 was repeated except for the use of the sodium salt of cobalt(II)tetracarboxyphthalocyanine obtained as described in Example 4. The product obtained displayed an X-ray diffraction typical of a hydrotalcite-like material with a basal spacing of 22.8±0.2 Å.

EXAMPLE 10

The intercalation of Co(II)meso-tetra (4-acetate) porphine tetrasodium salt is described in this example.

The metallo complex can be intercalated as described in Example 7 using the sodium salt of Co(II)meso-tetra (4-acetate) porphine. An X-ray powder diffraction pattern typical of a hydrotalcite-like material with a basal spacing of 18.4 ±0.2 Å was observed for the product.

EXAMPLE 11

The oxide material obtained from Example 5 was then reconstituted into a $Mg_{2.5}Al$-LDH-CoPcTs intercalation product by reacting the oxide with the sodium salt of the complex obtained from Example 3. The salt of the complex was kept at least 10% in molar excess. Using decarbonated deionized water with flowing argon gas the calcined $Mg_{2.5}Al$ LDH was added slowly to a heated solution heated and maintained at ~60° C. The reaction time was seven days. The product was then washed with hot deionized water by centrifugation and dried in a desiccator. The product displayed an X-ray diffraction typical of a hydrotalcite-like material with a basal spacing of 23.2±0.2Å.

Catalyst Testing of LDH Metal Complexes

Two reactions are reported here to serve as illustrative examples of the use of certain metallo macrocycles intercalated into the LDHs for organic oxidation catalysis.

COMPARATIVE EXAMPLE 12

This example illustrates the use of the metallo macrocycle complex, $[CoPcTs]^{4-}$, for the autoxidation of 1-decanethiol.

The reaction was carried out at 35° C. and pH 9.25 in the presence of a borate buffer. Oxygen pressure was within the sealed reaction vessel was kept within 730-735 torr. Dioxygen depletion was monitored using a gas buret. 0.010 mmol of $Na_4[CoPcTs]$ obtained from Example 3 in a vigorously stirred solution was allowed to equilibrate for two hours under an oxygen atmosphere prior to the injection of 1.54 mmoles (0.32 mL) of 1-decanethiol. Oxygen uptake was preceded by an induction period. After an induction period of 2.3 hours, a linear uptake of oxygen was observed for the homogenous catalyst. The turnover frequency was 21 mol thiol/mol $[CoPcTs]^{4-}$. After 12 hours the blue color of the catalyst faded to colorless, a gummy red precipitate formed at the bottom of the reaction flask and catalysis ceased.

EXAMPLE 13

This Example serves to illustrate the use of CoPcTs-Mg$_{2.5}$Al-LDH catalyst for autoxidation of decanethiol.

The catalyst obtained from Example 9 was used in the reaction using the conditions as described in Example 9. Hence a CoPcTs-Mg$_{2.5}$Al-LDH containing 0.010 mmol $[CoPcTs]^{4-}$ was used. The catalyst showed an induction time of 45 minutes and a turnover frequency of 40 mol thiol/$[CoPcTs]^{4-}$/hr. No catalyst degradation was observed after the first cycle. The catalyst maintained the blue color of the catalyst and no red precipitate was observed The catalyst would be reused over several reaction cycles without loss of activity.

COMPARATIVE EXAMPLE 14

Figure 4A:
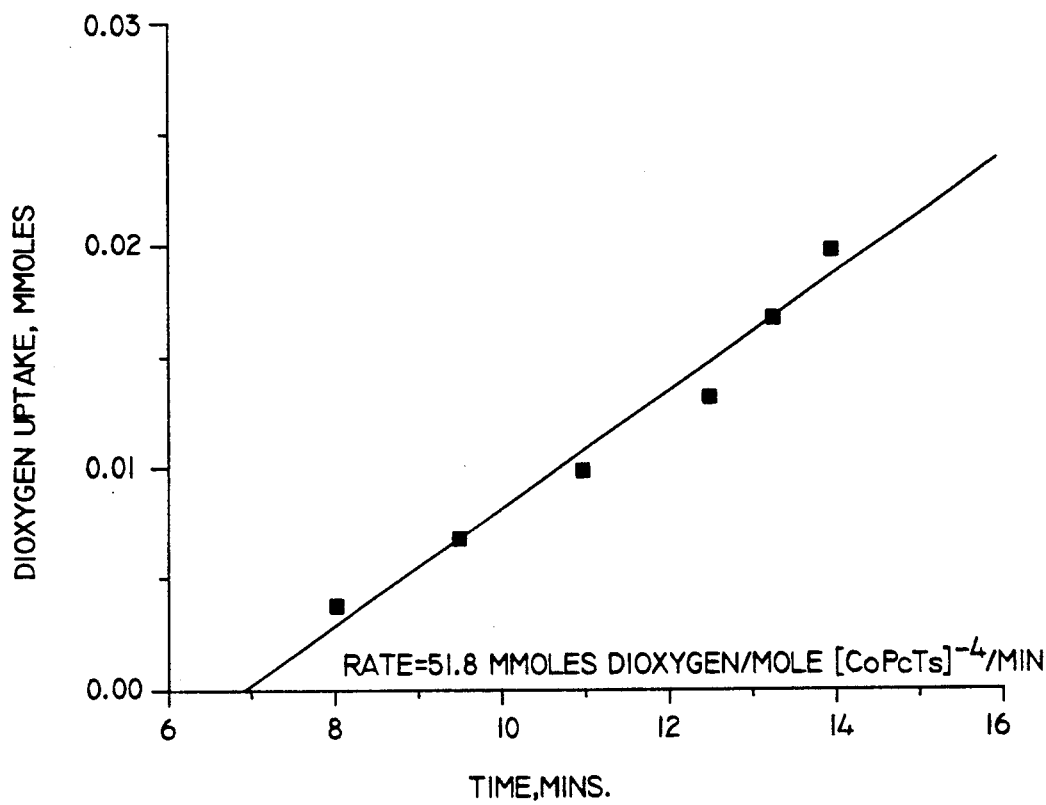
FIGS. 4A and 4B show initial dioxygen uptake plots for the autoxidation of $5.8 \times 10^{-4}$ moles of 2,6-di-t-butylphenol in 150 ml of 15:1 water to methanol (v/v at 35° C. in the presence of $5.1 \times 10^{-5}$ moles of $Na_4$-CoPcTs CoPcTs/LDH heterogenous catalyst (FIG. 4B).

This example illustrates the use of homogenous metallo macrocycles in particular Na$_4$CoPcTs for the selective autoxidation of 2,6-di-t-butylphenol to 2,6-di-t-butylbenzoquinone and 2,6,2',6'-tetra-t-butyldiphenoquinone. A 0.05 g portion of the $[CoPcTs]^{4-}$ catalyst prepared as described in Example 3 was added to 200 ml three necked flask containing 140 mL of de-ionized water. The solution could be heated to any temperature between 20° C. and 100° C. preferably 35° C. The O$_2$ concentration was monitored continuously by using a Clark type O$_2$ electrode purchased from Orion (Orion 98-07). The electrode was attached to a Fisher Accumet Selective Analyzer Model 750 pH meter for readout of dioxygen concentration in parts-per-million (ppm). Oxygen was bubbled into the flask till reaching the maximum concentration of 16 ppm or else 8 ppm. After a stabilization period of about 30 minutes about 0.12 g of the reactant (i.e. 2,6-di-t-butylphenol) dissolved in 10 mL methanol was added to the reaction flask using a gas tight syringe by injection through the gas-tight rubber stopper. The catalyst was observed to be deactivated in less than 25 catalytic turnovers (i.e. moles of product formed per mole of catalyst) and the color of the catalyst turned green. The results are shown in FIG. 4A.

EXAMPLE 15

Figure 4B:
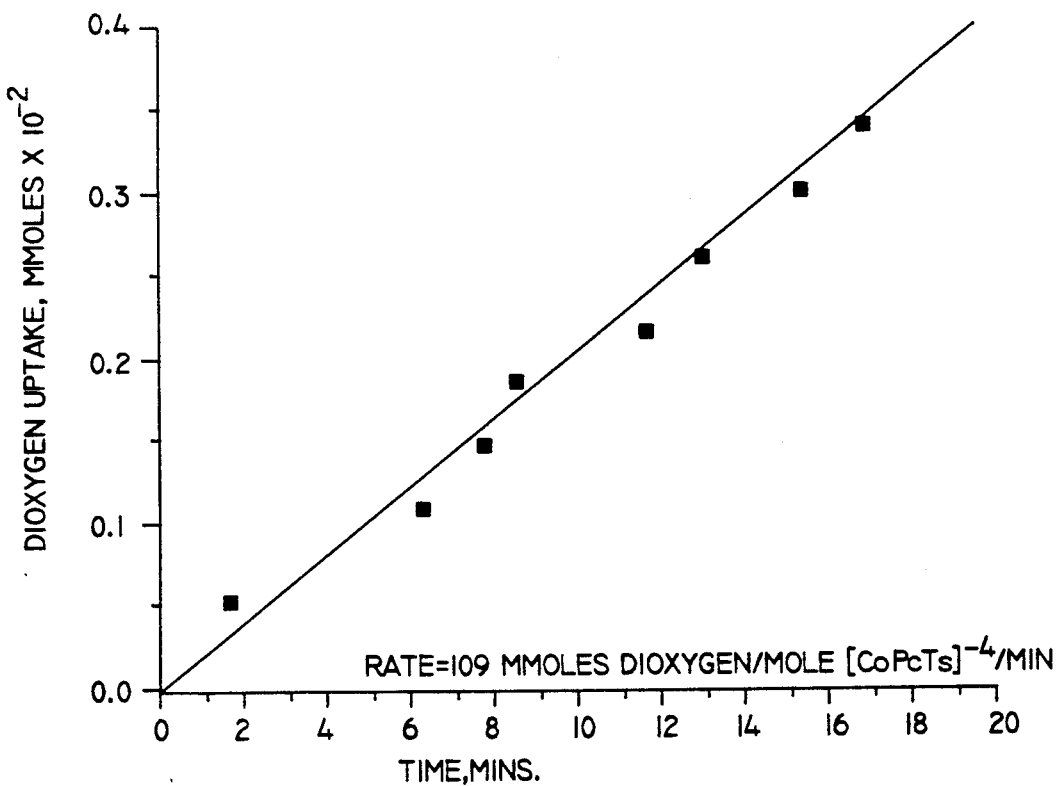

A CoPcTsMg$_{2.5}$Al-LDH heterogenous catalyst obtained as described in Example 7 was tested for the 2,6-di-t-butylphenol autoxidation as described in Example 13. A 0.40 g portion of the catalyst as obtained in Example 6 was used and 0.10 g of the reactant. In marked contrast to the homogenous catalyst, the LDH species exhibited about twice the rate of dioxygen uptake and remained fully active and it was possible to add more reactants without the catalyst deactivating and a total of 3200 turnovers (moles t-b-phenol/moles CoPcTs$^{4-}$) were obtained and the catalyst remained blue and in active form. The results are shown in FIG. 4B.

As used herein the term "disc-like" in reference to the metal complex means a flat or planar and round or oblong shape. The "plane" of the metal complex is across the flat or planar surface between edges of the disc-like shape.

As used herein the term "polyaryl" means that there are multiple aromatic groups forming a ring around a metal cation which forms a metal cation which forms a metal complex. The rings usually are heterocyclic rings containing N or oxygen coordinated with the metal cation.

It is intended that the foregoing description be only illustrative of the present invention and that the present invention be limited only by the hereinafter appended claims.

We claim:

1. A crystalline layered double hydroxide (LDH) metal complex which comprises:

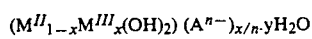

$$(M^{II}_{1-x}M^{III}_x(OH)_2) (A^{n-})_{x/n} \cdot yH_2O$$

as a spaced apart hydroxide host layers wherein $M^{II}$ is a divalent metal cation, $M^{III}$ is a trivalent metal cation, and $A^{n-}$ is intercalated with a phthalocyanine, with a disc-like shape wherein the disc-like shape defines a plane across the disc-like shape with the plane of the complex such that the disc-like shape is approximately orthogonal to a plane of the spaced apart hydroxide host layers which have a basal spacing greater than approximately 18 Å and x is between about 0.7 and 0.37, and y is a positive number and wherein the metal selected from the group consisting of a Group VII-B metal, metals from a cobalt and iron triads of Group VII and mixtures thereof.

2. The LDH of claim 1, wherein the phthalocyanine is Co(II)phthalocyaninetetrasulfonate.

3. The LDH of claim 1, wherein the phthalocyanine is Co(II)phthalocyaninetetracarboxylate.

4. The LDH of claim 1, wherein the phthalocyanine is Ni(II)phthalocyaninetetrasulfonate.

5. The LDH of claim 1, wherein the phthalocyanine is NI(II)phthalocyaninetetracarboxylate.

6. The LDH of claim 1, wherein the phthalocyanine is Cu(II)phthalocyaninetetrasulfonate.

7. The LDH of claim 1, wherein the phthalocyanine is Cu(II)phthalocyaninetetracarboxylate.

8. The LDH of claim 1, wherein the phthalocyanine is Co(II) dinuclear dodecasulfonatephthalocyanine.

9. The LDH of claim 1, wherein the phthalocyanine is Co(II) dinuclear dodecarboxyphthalocyanine.

10. The LDH of claim 1, wherein the phthalocyanine is Cu(II) dinuclear dodecasulfonatephthalocyanine.

11. The LDH of claim 1, wherein the phthalocyanine is Cu(II) dinuclear dodecarboxyphthalocyanine.

12. The LDH of claim 1, wherein the phthalocyanine is NI(II) dinuclear dodecasulfonatephthalocyanine.

13. The LDH of claim 1, wherein the phthalocyanine is Ni(II) dinuclear dodecarboxyphthalocyanine.

* * * * *

UNITED STATES PATENT AND TRADEMARK OFFICE
CERTIFICATE OF CORRECTION

PATENT NO. : 5,302,709
DATED : April 12, 1994
INVENTOR(S) : Thomas J. Pinnavaia, Elena M. Perez-Bernal, Ricardo Ruarno-Casero, Malama Chibwe It is certified that error appears in the above-indentified patent and that said Letters Patent is hereby corrected as shown below:

On title page, "OTHER PUBLICATION" "amd" should read —and—

Column 2, line 3, a period —.— should be inserted after "like" and before "The".

Column 3, line 20, "$^{3+}OH$" should be —$^{3+}OH^-$—.

Column 4, line 56, after "Na$_4$CoPcTs" and before "CoPcTs/LDH", the following should be inserted
—homogeneous catalyst (Figure 4A) and 1.75 x 10$^{-6}$ moles of—.

Column 6, line 28, "Mg$_6$Al$_2$(OH)" should be —Mg$_5$Al$_2$(OH)—.

Column 6, line 31, "(985)." should be —(1985).—.

Column 6, line 34, after "300" and before "550", —and— should be inserted.

Column 6, line 56, "HO$_2$-" should read —H$_2$O—.

Column 7, line 20, "butyldiphenoquinone" should be —butylbenzoquinone—.

Column 7, lines 20 and 21, "tetra-t-butylbenzoquinone" should be —tetra-t-butyldiphenoquinone—.

Column 7, line 64, "OH", should be — OH$^-$ —.

Column 9, line 5, a colon —:—, should be inserted after "follows" and before "the".

UNITED STATES PATENT AND TRADEMARK OFFICE
CERTIFICATE OF CORRECTION

PATENT NO. : 5,302,709
DATED : April 12, 1994
INVENTOR(S) : Thomas J. Pinnavaia, Elena M. Perez-Bernal, Ricardo Ruarno-Casero, Malama Chibwe It is certified that error appears in the above-indentified patent and that said Letters Patent is hereby corrected as shown below:

Column 9, line 18, "(Na$_4$CoPcTc)" should be --(Na$_4$CoPcTs)--.

Column 9, line 21, "1.4" should read --1:4--.

Column 10, line 19, "(Na$_4$CoPcTs" should read --Na$_4$CoPcTc--

Column 11, line 11, "of decanethiol" should read --of 1-decanethiol--.

Column 12, line 32 (Claim 1), "0.7" should read --0.17--.

Column 12, line 44 (Claim 5), "NI(II)" should read --Ni(II)--.

Column 12, line 58 (Claim 12), "NI(II)" should read --Ni(II)--.

Signed and Sealed this

Thirty-first Day of January, 1995

BRUCE LEHMAN

*Attest:*

*Attesting Officer*  *Commissioner of Patents and Trademarks*